United States Patent [19]

Okuyama et al.

[11] Patent Number: 4,937,273

[45] Date of Patent: Jun. 26, 1990

[54] PROCESS FOR PRODUCING ANTIBACTERIAL FLEXIBLE POLYURETHANE FOAM

[75] Inventors: Toru Okuyama, Sagamihara; Yasuo Kamimura; Kuniaki Yasunaga, both of Yokohama, all of Japan

[73] Assignee: Bridgestone Corporation, Tokyo, Japan

[21] Appl. No.: 284,656

[22] Filed: Dec. 15, 1988

[30] Foreign Application Priority Data

Dec. 16, 1987 [JP] Japan .................................. 62-318397

[51] Int. Cl.$^5$ .............................................. C08G 18/14
[52] U.S. Cl. .................................... 521/119; 521/122; 521/123
[58] Field of Search ........................ 521/119, 122, 123

[56] References Cited

U.S. PATENT DOCUMENTS 3,931,062 1/1976 Cobbledick .......................... 521/123

Primary Examiner—Maurice J. Welsh
Attorney, Agent, or Firm—Birch, Stewart, Kolasch & Birch

[57] ABSTRACT

The present invention provides a process for producing an antibacterial flexible polyurethane foam containing an antibacterial agent dispersed therein from a foaming mixture composed of polyols, organic isocyanates, catalysts, and blowing agents. The process is characterized in that the antibacterial agent is added to the foaming mixture and the catalyst is an organic amine which is used alone or in combination with a tin compound. In the latter case, the tin compound is a tetravalent tin compound or a divalent tin compound which is used in an amount less than 1 part by weight for 1 part by weight of the antibacterial agent. The antibacterial flexible polyurethane foam retains the antibacterial action for a long time and is safe because it contains an inorganic antibacterial agent dispersed therein which does not yield resistant bacteria.

23 Claims, No Drawings

PROCESS FOR PRODUCING ANTIBACTERIAL FLEXIBLE POLYURETHANE FOAM

BACKGROUND OF THE INVENTION

1. Field of the Invention

The present invention relates to a process for producing a flexible polyurethane foam having an antibacterial property.

2. Description of the Prior Art

Heretofore, flexible polyurethane foams have found a variety of uses including uses in kitchen cleaners, body sponges, puffs, filter elements, and mattresses. These polyurethane foams, are often required to have an antibacterial property. A possible way to impart an antibacterial property to flexible polyurethane foams is to impregnate the foam with an antibacterial agent by utilizing the open-cell structure characteristic of flexible polyurethane foam. The antibacterial foam prepared in this manner does not retain the antibacterial action for a long period of time because the antibacterial agent will soon escape from the open cells. Thus, there has been a demand for antibacterial flexible polyurethane foam which maintains its antibacterial effect for a long period of time.

The present invention was completed to meet such a demand.

SUMMARY OF THE INVENTION

Therefore, it is an object of the present invention to provide a process for producing an antibacterial flexible polyurethane foam which stably retains a good antibacterial effect for a long period of time.

To achieve the above-mentioned object, the present inventors carried out a series of research which led to the finding that it is possible to produce a flexible polyurethane foam containing an antibacterial agent integrally dispersed therein, exerting an outstanding antibacterial effect, and maintaining the antibacterial effect for a long time, from a foaming mixture composed of polyol, organic isocyanate, catalyst, and blowing agent, if the foaming mixture is incorporated with an inorganic antibacterial agent, especially powdery metal ion (such as silver ion, copper ion, and zinc ion), antibacterial agent, preferably one in which the metal ion is supported on zeolite.

According to the present invention, an inorganic antibacterial agent is used because organic antibacterial agents are deactivated during the foaming process or leached out gradually during use. In addition, organic antibacterial agents are liable to yield resistant bacteria.

An inorganic antibacterial agent, especially a metal ion antibacterial agent supported on zeolite, imparts a good antibacterial action to flexible polyurethane foam even when it is added to the foaming mixture and subjected to the foaming reaction. The thus obtained flexible polyurethane foam has a good antibacterial action which lasts for a long time. In addition, it is safe and it does not yield resistant bacteria. Therefore, it is suitable for use as a kitchen cleaner, body sponge, puff, filter element, and mattress.

Usually, the production of flexible polyurethane foam is catalyzed by an organic amine and a divalent tin compound in combination. This practice, however, is not adequate in the present invention. The results of the present inventors' investigation indicate that a divalent tin compound used in an ordinary catalytic amount easily deactivates the metal ion antibacterial agent added to the foaming raw material. For the antibacterial agent to produce its effect, it is necessary that an organic amine should be used alone as the catalyst or a tetravalent tin compound or a small amount of a divalent tin compound should be used in combination with an organic amine catalyst. The amount of a divalent tin compound should be less than 1 part by weight for 1 part by weight of the antibacterial agent.

Accordingly, the present invention provides a process for producing an antibacterial flexible polyurethane foam containing an antibacterial agent dispersed therein from a foaming mixture composed of polyol, organic isocyanate, catalyst, and blowing agent. The process is characterized in that the antibacterial agent is added to the foaming mixture and the catalyst is an organic amine which is used along or in combination with a tin compound. In the latter case, the tin compound is a tetravalent tin compound, or a divalent tin compound which is used in an amount less than 1 part by weight for 1 part by weight of the antibacterial agent.

The above and other objects, features and advantages of the present invention will be more apparent from the following description.

DETAILED DESCRIPTION OF THE INVENTION

The polyols, organic isocyanates, and blowing agents that can be used in the present invention are not specifically limited; but they can be selected from those which are commonly used for the production of flexible polyurethane foam. In addition, they can be used according to the ordinary formulation. These raw materials may be incorporated with other components which are commonly used for the production of flexible polyurethane foam.

More specifically either polyether polyol or polyester polyol can be used as a polyol in the present invention. Examples of polyether polyols include adducts of polyhydric alcohols (such as ethylene glycol, propylene glycol, glycerin, trimethylolpropane, pentaerythritol and sucrose) with alkylene oxide (such as ethylen oxide, propylene oxide and butylene oxide); adducts of amines (such as diethanolamine, triethanolamine, and ethylenediamine) with alkylene oxide (such as ethylen oxide, propylene oxide and butylene oxide); and graft-type polymer polyol derived from styrene of acrylonitrile. Examples of polyester polyols include hydroxyl-terminated polyester polyol and polycaprolactone. The former is produced by polymerizing an aliphatic carboxylic acid (such as malonic acid, succinic acid, and adipic acid) or an aromatic carboxylic acid (such as phthalic acid and terephthalic acid) or a mixture thereof with an aliphatic glycol (such as ethylene glycol, propylene glycol and diethylene glycol) or a triol (such as trimethylolpropane and glycerin). The latter is obtained by the ring opening polymerization of lactone.

The polyol should preferably have a molecular weight of 600 to 6000, more preferably 1000 to 5000.

The organic isocyanate that can be used in the present invention is an organic compound containing two or more isocyanate groups in the one molecule. It includes aliphatic isocyanates, aromatic isocyanates, polyisocyanate monomer, mixtures thereof, and modified products thereof. Examples of aliphatic isocyanates include hexamethylene diisocyanate, isophore one diisoyanate, and methylcyclohexane diisocyanate. Examples of aromatic isocyanates include tolylene diisocyanate, (2,4- and/or 2,6-isomers), diphenylmethane diisocyanate, and bitolylene diisocyanate. The organic isocyanate should preferably be used in an amount of 15 to 70 parts by weight for 100 parts by weight of the polyol.

The blowing agent that can be used in the present invention is water which reacts with the organic isocyanate to form carbon dioxide gas. If necessary, it can be used in combination with a low-boiling organic compound (such a halogenated hydrocarbon including trichloromonofluoromethane and methylene chloride) or a gas (such as air and carbon dioxide).

The formulation for the flexible polyurethane foam may contain flame retardant (e.g., halogenated phosphate ester), antioxidant, plasticizer, filler, and coloring agent, in an amount not harmful to the effect of the present invention.

The process of the present invention is catalyzed by an organic amine or tin catalyst. The organic amine is used alone or in combination with a tin catalyst. The tin catalyst is a tetravalent tin compound or a divalent tin compound. Incidentally, the organic amine should preferably be used in an amount of 0.1 to 10 parts by weight for 100 parts by weight of polyol. The tetravalent tin compound should preferably be used in an amount of 0.1 to 2 parts, more preferably 0.1 to 1 parts, by weight for 100 parts by weight of polyol. The divalent tin compound, should be used in an amount less than 1 part, more preferably less than 0.7 parts, by weight for 1 part by weight of the antibacterial agent.

Examples of the organic amine that can be used in the present invention include triethylenediamine, N-methylmorpholine, N-ethyl-morpholine, tetramethyl-1,4-butanediamine, dimethylethanolamine, diethylethanolamine, triethylamine, dimethylbenzylamine, triethanol-amine, 1,8-diazacyclo(5.4.0)undecene-7, bis(2-dimethylaminoethyl)ether, trimethylaminoethyl piperagine, methylhydroxyethyl piperazin, N,N,N',N'-tetramethylhexamethylenediamine, N,N,N',N'-tetramethylpropylenediamine, N,N,N',N',N"-pentamethyldiethylenetriamine, N-trioxyethylene-N,N-dimethylamine, and N,N,N'-trimethylaminoethyl ethanolamine. Examples of the tetravalent tin compound include dibutyltin dilaurate and dibutyltin diacetate. Examples of the divalent tin compound include stannous octoate and stannous oleate.

According to the present invention, the foaming mixture is incorporated with an antibacterial agent. A preferred antibacterial agent is an inorganic one, especially a metal ion (such as silver ion, copper ion, and zinc ion) antibacterial agent. The more desirable antibacterial agent is a metal ion (such as silver ion, copper ion, and zinc ion) antibacterial agent supported on zeolite. More detailedly, the most preferable antibacterial agent is one obtained by mixing a natural or synthetic zeolite with a solution containing at least one kind of ions selected from the group consisting of silver ions, copper ions and zinc ions which may be prepared by dissolving at least one water-soluble salt selected from the group consisting of silver salts (e.g., silver nitrate, etc.), copper salts (e.g., copper nitrate, etc.) and zinc salts (e.g., zinc chloride, zinc nitrate, etc.), and ion exchanging a part or all of ion-exchangable metal ions contained in zeolite to at least one kind of ions selected from the group consisting of silver ions, copper ions and zinc ions. In the zeolite antibacterial agent, silver content should preferably be 0.0006 to 4% by weight, copper content should preferably be 0.03 to 10% by weight and zinc content should preferably be 0.04 to 14% by weight of the total weight of the agent. An example of such antibacterial agents is disclosed in Japanese Patent Laid-open No. 181002/1985. A commercial product is available under the trade name of Zeomic ® from Cinnanen New Ceramics Co., Ltd. It is also possible to use an antibacterial agent in which the above-mentioned metal ion is supported on activated carbon.

The inorganic antibacterial agent should preferably be used in the form of powder having an average particle diameter of 0.1 to 1 μm. The inorganic antibacterial agent may be used in a proper amount according to the intended application of flexible polyurethane foam. A preferred amount should be more tha 0.1 parts by weight, more preferably 0.1 to 3 parts by weight for 100 parts by weight of polyol.

The foaming mixture incorporated with the avobementioned antibacterial agent can be made into an antibacterial flexible polyurethane foam by either a one-shot process or a prepolymer process under ordinary foaming conditions. In the one-shot process, a polyol, isocyanate, water, amine catalyst, tin catalyst, antibacterial agent and, if necessary, an auxiliary agent are independently introduced into a mixing room. Then the components are mixed and the mixture is provided on a conveyor belt and allowed to foam. In the prepolymer process, a prepolymer having an isocyanate terminating group is prepared by reacting a polyol with an excess of a isocyanate, and the thus prepared prepolymer is used as an isocyanate in the one-shot process.

The flexible polyurethane foam produced according to the process of the present invention may be used in various application areas such as a kitchen cleaner, body sponge, puff, filter element, and mattress. These are exemplary only and the application areas are not limited to them.

As mentioned above, the process of the present invention permits the production of an antibacterial flexible polyurethane foam which stably retains high antibacterial action for a long time. The antibacterial flexible polyurethane foam is safe because it contains an inorganic antibacterial agent dispersed therein which does not yield resistant bacteria.

The invention will be explained in more detail with reference to the following examples and comparative examples, which are not intended to limit the scope of the invention. In the examples, "parts" means "parts by weight".

EXAMPLES 1 AND COMPARATIVE EXAMPLES 1

Flexible polyurethane foams were prepared in the usual way according to the formulations shown in Table 1. The polyol, TDI the mixture of triethylenediamine and water, L-6202, tin catalyst, trichloromonofruolomethane, and antibacterial agent were introduced into the mixing room at predetermined flow rates where the flow rate of polyol is 50 kg/m$^3$. Then, the components were mixed at a high agitation speed of 4500 rpm and the mixture was provided on a conveyor belt having a width of 2100 mm and continuously moving in one direction to prepare a polyurethane foam. The foaming mixture contains Zeomic ® AZ10N which is an antibacterial agent available frrom Cinnanen New Ceramics Co., Ltd. The foam mixture contains 3.65% by weight of Ag and 6.35% by weight of Zn supported on zeolite. The resulting polyurethane foams were tested for antibacterial action in the following manner. The results are shown in Table 1.

Method For Testing the Antibacterial Action 40 ml of sterile physiological saline placed in a 300-ml Erlenmeyer flask is inoculated with *Escherichia coli* (about 100,000 per ml). The number of the bacteria is counted at certain time intervals while the medium is shaken at 20° C. The values in Table 1 indicate the number of the bacteria in 1 ml of the medium. The medium contains small foam pieces (about 5 mm cube) cut from a specimen measuring $2\times2\times5$ cm.

TABLE 1

| Formulation (parts) | Example 1 | Example 2 | Comparative Example 1 |
|---|---|---|---|
| Triol (MW = 3000) (*1) | 100 | 100 | 100 |
| TDI (*2) | 64.6 | 64.1 | 65.1 |
| Water | 4.9 | 5.3 | 5.3 |
| Triethylenediamine | 0.36 | 0.46 | 0.46 |
| Stannous octoate (divalent tin catalyst) | 0.07 | — | 0.46 |
| Dibutyltin dilaurate (tetravalent tin catalyst) | — | 0.2 | — |
| L-6202 (*3) | 1.7 | 1.7 | 1.7 |
| Trichloromonofluoromethane | 3.0 | 10.0 | 10.0 |
| Zeomic AZ10N | 0.3 | 0.3 | 0.3 |
| Antibacterial test | | | |
| 0 hour (initial) | 110,000 | 68,000 | 100,000 |
| 24 hours | 19,000 | 150 | 19,000,000 |
| 48 hours | 0 | 0 | 42,000,000 |
| Antibacterial action | yes | yes | none |

Notes to Table 1
(*1) Polyol prepared by addition polymerization of glycerin with propylene oxide and ethylene oxide
(*2) Tolylene diisocyanate (Ratio of 2,4-/2,6-isomers = 80/20)
(*3) Dimethylpolysiloxane-polyoxyethylene-polyoxy-propylene copolymer (a product of Nippon Unicar Co., Ltd.)

EXAMPLE 3 AND COMPARATIVE EXAMPLE 2

Flexible polyurethane foams were prepared in the same way as Example 1 according to the formulations shown in Table 2 except that the flow rate of polyol is 40 kg/m³, and the width of conveyor belt is 1100 mm. The foaming mixture contains the same antibacterial agent as used in Examples 1 and 2. The resulting polyurethane foams were tested for antibacterial action in the same manner as in Examples 1 and 2. In this example, the antibacterial action was tested for not only *Escherichia coli* but also *Staphylococcus* and *Psudomonas aeruginosa*. The results are shown in Table 2.

TABLE 2

| Formulation (parts) | Example 3 | Comparative Example 2 |
|---|---|---|
| Polyester polyol (*3) | 100 | 100 |
| TDI (*1) | 47.2 | 47.2 |
| Water | 3.8 | 3.8 |
| AX-31 (*4) | 1.0 | 1.0 |
| Fomres 7786 (*5) | 1.0 | 1.0 |
| PRX-607 (*6) | 0.5 | 0.5 |
| N-ethylmorpholine | 2.4 | 2.4 |
| Zeomix AZ10N | 0.25 | — |
| Antibacterial test | | |
| *Escherichia coli* | | |
| 0 hour (initial) | 100,000 | 110,000 |
| 24 hours | 240 | 4,600,000 |
| 48 hours | 0 | 18,000,000 |
| *Staphylococcus* | | |
| 0 hour (initial) | 61,000 | 90,000 |
| 24 hours | 1,000 | 60,000 |
| 48 hours | 0 | 420,000 |
| *Psudomonas aeruginosa* | | |
| 0 hour (initial) | 120,000 | 60,000 |
| 24 hours | 0 | 120,000 |
| 48 hours | 0 | 230,000 |

Notes to Table 2
(*3) Polycondensate of adipic acid with diethylene glycol and trimethylolpropane. OH number = 51 (KOH mg/g) (a product of Nippon Polyurethane Co., Ltd.)
(*4) Anionic surface active agent (a product of Sanyo Kasei Co., Ltd.)
(*5) Nonionic surface active agent (a product of Witco Chemical)
(*6) Silicone surface active agent (a product of Toray Silicone Co., Ltd.)

Preparation Example of the Antibacterial Agent 0.91 kg of dry A-type zeolite powder (1.03 Na$_2$O.Al$_2$O$_3$.1.91 SiO$_2$.zH$_2$O) are mixed with an aqueous solution containing 0.11 mol AgNO$_3$ and 0.98 mol Zn(NO$_3$)$_2$ to obtain about 3.2 l of slurry having a pH of 4.1 and the slurry is maintained at about 25° C. for 6 hours under agitation. After the completion of the ion exchange, the zeolite is recovered by filtration and washed with water. Then, the silver and zinc ions-changed zeolite is dried under vacuum, pulverized and classified. The thus obtained zeolite has an average particle size of 1.1 μm and a specific surface area of 718 m$^2$/g, and contains 1.48% by weight of Ag and 6.82% by weight of Zn.

What is claimed is:

1. A process for producing an antibacterial flexible polyurethane foam containing an antibacterial agent dispersed therein, which comprises:
   mixing polyol, organic isocyanate, catalyst, blowing agent, and a metal ion antibacterial agent supported on zeolite, said catalyst being an organic amine which is used alone or in combination with a tetravalent tin compound or with a divalent tin compound in an amount less than 1 part by weight for 1 part by weight of the metal ion antibacterial agent supported on zeolite, and
   foaming said mixture to obtain a flexible polyurethane foam.

2. The process according to claim 1, wherein the metal ion antibacterial agent is in the form of powder.

3. The process according to claim 2, wherein the metal ion antibacterial agent is a silver, copper, or zinc ion antibacterial agent.

4. The process according to claim 1, wherein the polyol is polyether polyol or polyester polyol.

5. The process according to claim 4, wherein the polyether polyols comprise adducts of polyhydric alcohols with alkylene oxide, adducts of amines with alkylene oxide, or a graft-type polymer polyol derived from styrene of acrylonitrile.

6. The process according to claim 4, wherein the polyester polyol includes hydroxyl-terminated polyester polyol or polycaprolactone.

7. The process according to claim 1, wherein the molecular weight of the polyol is 600 to 6000.

8. The process according to claim 1, wherein the organic isocyanate contains two or more isocyanate groups in one molecule.

9. The process according to claim 8, wherein the organic isocyanate comprises aliphatic isocyanates, aromatic isocyanates, polyisocyanate monomer, mixtures thereof, or modified products thereof.

10. The process according to claim 9, wherein the aliphatic isocyanates are selected from the group consisting of hexamethylene diisocyanate, isophorone diisocyanate, and methylcyclohexane diisocyanate.

11. The process according to claim 9, wherein the aromatic isocyanates are selected from the group consisting of tolylene diisocyanate, 2,4-isomers, 2,6-isomers, mixtures of 2,4-isomers and 2,6-isomers, diphenylmethane diisocyanate, and bitolylene diisocyanate.

12. The process according to claim 1, wherein the organic isocyanate is used in an amount of 15 to 70 parts by weight for 100 parts by weight of the polyol.

13. The process according to claim 1, wherein the blowing agent is water.

14. The process according to claim 13, wherein the blowing agent further comprises a low-boiling organic solvent or a gas.

15. The process according to claim 1, wherein the organic amine is used in an amount of 0.1 to 10 parts by weight for 100 parts by weight of polyol.

16. The process according to claim 1, wherein the tetravalent tin compound is used in an amount of 0.1 to 2 parts by weight for 100 parts by weight of polyol.

17. The process according to claim 1, wherein the divalent tin compound is used in an amount less than 1 part by weight for 1 part by weight of the antibacterial agent.

18. The process according to claim 1, wherein the organic amine is selected from the group consisting of triethylene-diamine, N-methylmorpholine, N-ethylmorpholine, tetramethyl-1,4-butanediamine, dimethylethanol-amine, diethylethanolamine, triethylamine, dimethylbenzylamine, triethanol-amine, 1,8-diazacyclo (5.4.0)undecene-7, bis(2-dimethylaminoethyl)ether, trimethylaminoethyl piperagine, methylhydroxyethyl piperazin, N,N,N',N'-tetramethylhexamethyllenediamine, N,N,N',N'-tetramethylpropylenediamine, N,N,N,'N',N''-pentamethyldiethylenetriamine, N,-trioxyethylene-N, N-dimethylamine, and N,N,N'-trimethylaminoethyl ethanolamine.

19. The process according to claim 1, wherein the tetravalent tin compound is dibutyltin dilaurate or dibutyltin diacetate.

20. The process according to claim 1, wherein the divalent tin compound is stannous octoate or stannous oleate.

21. The process according to claim 3, wherein the silver content is 0.0006 to 4% by weight, the copper content is 0.03 to 10% by weight or the zinc content is 0.04 to 14% by weight of the total weight of the agent.

22. The process according to claim 1, wherein the metal ion antibacterial agent is used in the form of powder having an average particle of 0.1 to 1 μm.

23. The process according to claim 1, wherein the metal ion antibacterial agent is present in an amount of 0.1 parts by weight for 100 parts by weight of polyol.

* * * * *